United States Patent [19]
Endo

[11] 3,877,558
[45] Apr. 15, 1975

[54] CLUTCH RELEASE BEARING ASSEMBLY

[75] Inventor: Nariaki Endo, Osaka, Japan

[73] Assignee: Koyo Seiko Company, Limited, Osaka, Japan

[22] Filed: Jan. 23, 1973

[21] Appl. No.: 326,088

[30] Foreign Application Priority Data
Jan. 24, 1972 Japan.......................... 47-10224

[52] U.S. Cl. .............................. 192/98; 192/110 B
[51] Int. Cl. ..................... F16d 19/00; F16d 23/12
[58] Field of Search .......... 192/98, 110 B; 308/233, 308/187.2, 236

[56] References Cited
UNITED STATES PATENTS

| | | | |
|---|---|---|---|
| 1,821,877 | 9/1931 | Bowne | 308/236 |
| 1,909,230 | 5/1933 | Smith | 308/236 |
| 2,030,813 | 2/1936 | Dolza | 192/110 B |
| 2,729,479 | 1/1956 | Leister | 308/236 X |
| 3,090,628 | 5/1963 | Giulietti | 308/187.2 X |
| 3,105,581 | 10/1963 | Schick | 192/110 B X |
| 3,286,802 | 11/1966 | Fadler et al. | 192/98 |
| 3,340,747 | 9/1967 | Waker et al. | 308/236 X |
| 3,361,497 | 1/1968 | Stengel | 308/187.2 |
| 3,550,974 | 12/1970 | Kupchick | 308/187.2 |
| 3,631,954 | 1/1972 | Coaley | 192/98 |

Primary Examiner—Samuel Scott
Assistant Examiner—Lance W. Chandler
Attorney, Agent, or Firm—Kane, Dalsimer, Kane, Sullivan and Kurucz

[57] ABSTRACT

A clutch release bearing assembly including an inner race ring, an outer race ring, and balls interposed between the two rings. The inner race ring is extended axially in one direction along a retainer on which the bearing slides back and forth. An annular flange member is fixed to the end of the extended portion of the inner race ring for serving as a clutch release fork engaging member and as a water-proof and dust-proof protector.

6 Claims, 3 Drawing Figures

CLUTCH RELEASE BEARING ASSEMBLY

BACKGROUND OF THE INVENTION

1. Field of the Invention

This invention relates to a clutch release bearing assembly, and more particularly to an improved clutch release bearing assembly wherein a hub is eliminated and an inner race ring is associated with a clutch release fork.

2. Background of the Invention

The well known conventional type clutch release bearing assembly has a construction as described hereinbelow. A bearing which comprises as inner race ring, an outer race ring and a plurality of balls interposed therebetween is mounted on a hub which is slidably mounted on a cylindrical retainer through which a driving shaft extends and a flange engaged with a clutch engaging member is formed on the outer race ring of the bearing, an annular cover having an l-shaped cross section is fixed to the outer surface of the outer race ring, the metal cover is provided with a radially extending flange portion formed integrally therewith at the end thereof on the opposite side to said flange of the outer race ring and the flange portion of the metal cover is extended up to the vicinity of the inner race ring, and said hub is provided integrally therewith with a pair of radially outwardly disposed projections for engagement with a clutch release fork, and provided with a step portion formed on axial end thereof opposite to said projections.

In the conventional type clutch release bearing assembly having a construction as described above, the hub and the bearing slidably mounted on the cylindrical retainer are separately manufactured and the inner race ring of the bearing is press-fitted to the step portion of the hub by axial force when a clutch release bearing assembly is built up.

Therefore, the radial clearance in the bearing varies undesirably and the existence of a correct rolling contact angle in the bearing cannot be ensured, and further there is a bear of making a press mark on the raceway surface of the race rings by said axial force.

Further, in the conventional type clutch release bearing assembly the external dimension of the assembly is made large by all means due to the thickness of the step portion of the hub to which the inner race ring is mounted in addition to the thickness of the inner race ring itself. Therefore, it is difficult to make the clutch release bearing assembly light in weight and compact in size. Further, it is necessary to provide a pair of radially outwardly disposed projections on the hub to be engaged with the clutch release fork at the time of clutch release, and accordingly, the construction of the assembly becomes complicated and complex and a number of manufacture processes are necessitated. On the other hand, since it has been possible to let the radially extending flange portion of said metal cover mounted to the outer race ring be in complete contact with the inner race ring to completely shield the interior of the bearing from outside, it has been unable to prevent the invasion of the ambient dusts and moisture into the interior of the bearings made by attraction effect caused by the rotation off the clutch assembly.

SUMMARY OF THE INVENTION

In light of the above description of the conventional clutch release bearing assembly, the primary object of the present invention is to provide a new and improved clutch release bearing assembly in which a hub is eliminated by extending axially in one direction the inner race ring of the bearing and there is no fear of changing the radial clearance in the clutch release bearing and making a press mark on the raceway surface of the race rings in building up the assembly.

Another object of the present invention is to provide a new and improved clutch release bearing assembly in which a clutch fork engaging member is directly fixed to the axially extended portion of the inner race ring without any hub and the bearing is directly slidably mounted on a cylindrical retainer to simplify the construction of the assembly and to make a light, compact in size and economically advantageous clutch release bearing.

Still another object of the present invention is to provide a new and improved clutch release bearing assembly in which the clutch release fork engaging member is directly fixed to the axially extended portion of the inner race ring and serves as a waterproof and dustproof protector of the bearing.

Preferred EMBODIMENTS OF THE INVENTION

Figure 1:
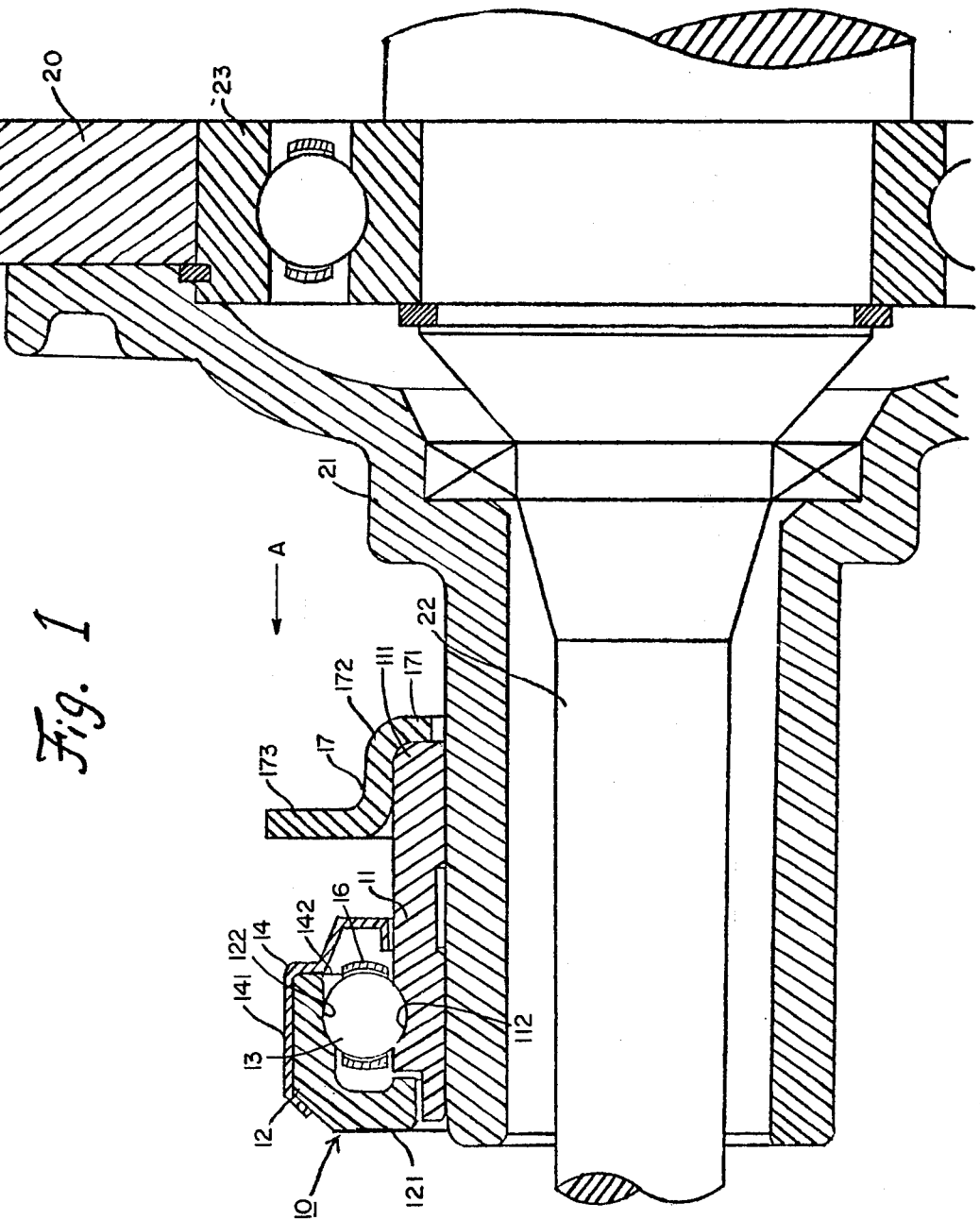
FIG. 1 is a longitudinal sectional view of the first embodiment of the present invention.

Referring to FIG. 1, the whole construction of the clutch release bearing assembly in accordance with the present invention is indicated at a reference numeral 10 and comprises an inner race ring 11 having an axially extending portion, an outer race ring, 12 provided with a radially and inwardly extending annular flange portion 121, a plurality of balls 13 interposed between the inner and outer race rings and maintained in predetermined spaced relative positions by cage 16, a metal cover 14 mounted to the outer race ring 12, and an annular flange member 17 hereinafter referred to. The all elements are combined in a unit and slidably mounted to a cylindrical retainer 21 which is in turn fixed to a speed change gear box 20. An input shaft 22 connected with the rear portion of an engine crank shaft not shown is provided in said retainer 21.

The inner race ring 11 of the bearing assembly 10 is directly slidably mounted on the outer periphery of the cylindrical retainer 21 as illustrated. The inner race ring 11 is formed to have a long length in the axial direction along the input shaft 22 and is provided at the end portion on the side opposite to the speed change gear box side with a raceway 112 in the peripheral direction. An outer race ring 12 is provided with a raceway 122, and provided at the end thereof on the opposite side to said speed change gear box with an inwardly and radially extending annular flange portion 121 formed integrally therewith. A plurality of balls 13 are provided between the raceway 112 and 122. With the outer surface of the flange portion 121 thereof is engaged a clutch release lever not shown. Outside the outer race ring 12 is mounted a metal cover 14 just like a conventional type clutch release bearing assembly. The metal cover 14 is supported on the outer race ring 12 with a cylindrical portion 141 thereof extending in parallel to the axis of the bearing and further extends radially inwardly on the opposite side thereof to said annular flange portion side. The end of the radially and inwardly extending portion of the metal cover 14 is extended up to the vicinity of the outer surface of the inner race ring 11.

At the end 111 of the extending portion of said inner race ring 11, an annular flange member 17 having a substantially S-shaped cross section is mounted as shown in FIG. 1. The flange member 17 comprises a cylindrical portion 172 attached to the outer surface of the inner race ring 11, an engaging portion 171 radially inwardly extending at one end of said cylindrical portion 172 at said end 111 of the inner race ring 11, and a rising portion 173 radially outwardly extending at the other end of said cylindrical portion 172. The flange member 17 is fixed to the corner of the end 111 of the extending portion of the inner race ring 11 with said cylindrical portion 172 and said engaging portion 171. The rising portion 173 of the annular flange member 17 is engaged with a clutch release fork not shown on the side of said speed change gear box. So that the bearing assembly as a whole is slid along the retainer 21 when it is exerted with a force in the direction as indicated with an arrow A in FIG. 1.

Since the present invention is constructed substantially as described hereinabove, there is no need to provide a hub between the retainer and the bearing as in the conventional device and accordingly the construction as a whole can be made compact in size. Further, in addition to the metal cover 14, the rising portion 173 of the annular flange member 17 engaged with the clutch release fork serves to prevent the invasion of the dusts and moisture or dirty water into the interior of the bearing assembly effectively.

Figure 2:
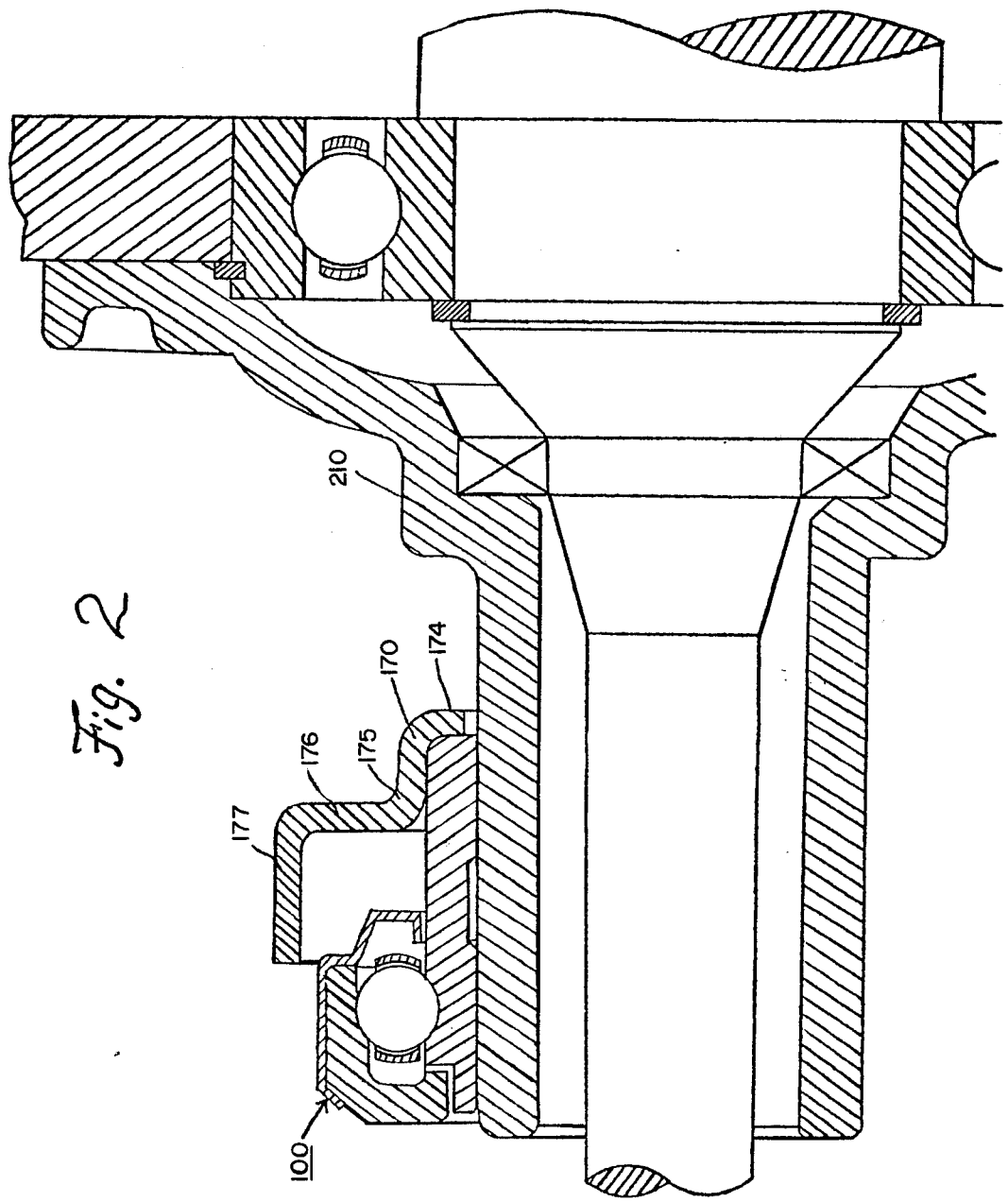
FIG. 2 is a longitudinal sectional view of the second embodiment of the present invention.

Referring to FIG. 2 showing another embodiment of the present invention, the construction or shape of the annular flange member mounted to the inner race ring is different from that of the annular flange member 17 shown in FIG. 1. Since the construction of the retainer 210 and the bearing 100 and other elements shown in FIG. 2 are all the same as those shown in the first embodiment shown in FIG. 1, the descriptions thereof are eleminated here. The annular flange member 170 employed in this second embodiment also has a cylindrical portion 175 extending in the axial direction of the bearing, an radially and inwardly extending engaging portion 174 formed at the speed change gear box side end of said cylindrical portion 175, and an radially and outwardly extending rising portion 176 formed at the other end of said cylindrical portion 175 similarly to said first embodiment shown in FIG. 1. Besides, the annular flange member 170 of the second embodiment of this invention is provided with a second cylindrical portion 177 formed at the outer peripheral end of said rising portion 176 extending in the axial direction of the bearing over the outer race ring. The length of the second cylindrical portion 177 of the flange member 170 is preferred to partially cover the outer race ring as shown in FIG. 2. By forming the second cylindrical portion 177 at the outer peripheral end of the rising portion 176 of the annular flange member 170, the invasion of the dusts and the like into the interior of the bearing is far more effectively prevented.

Figure 3:
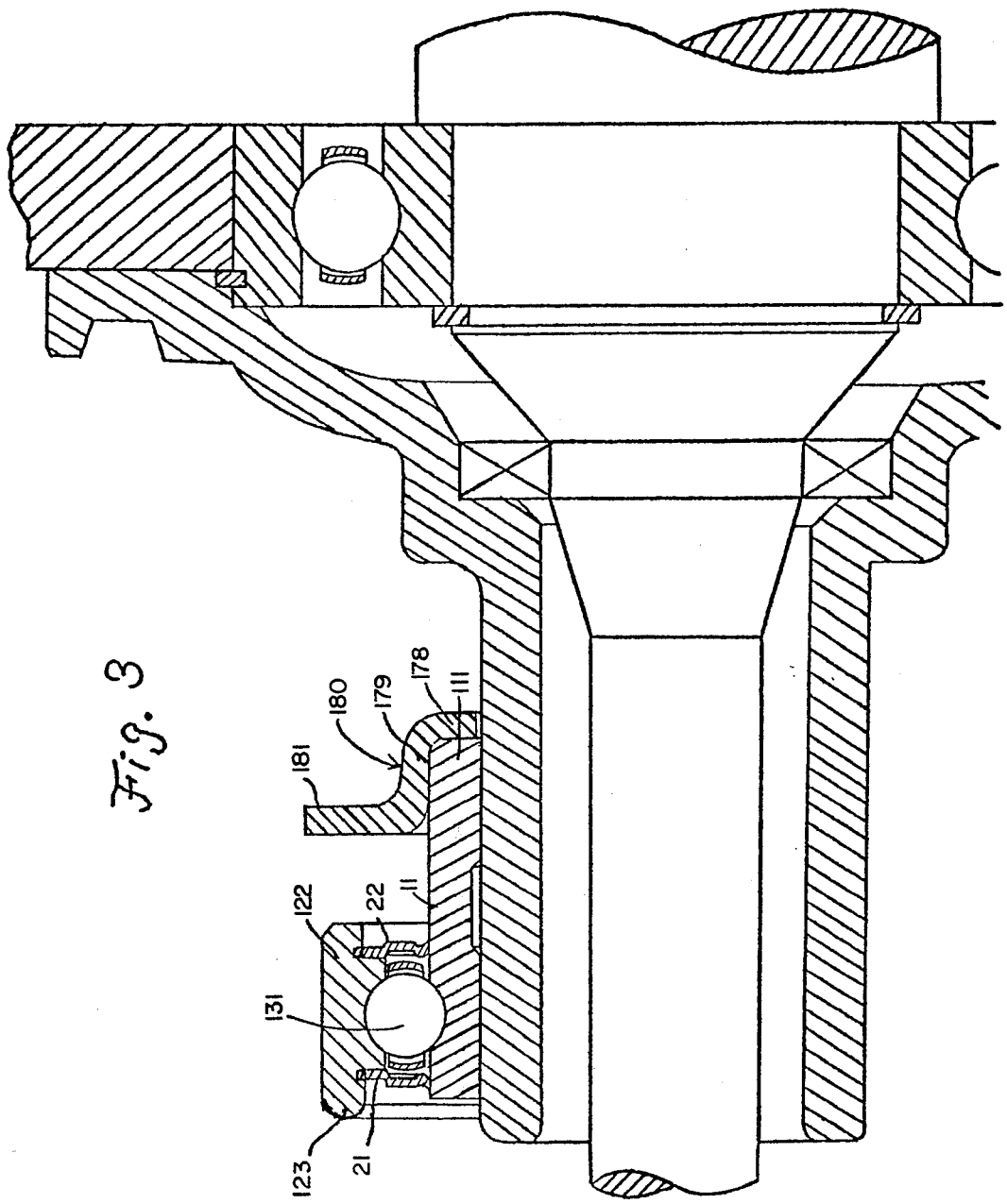
FIG. 3 is a longitudinal sectional view of the third embodiment of the present invention.

Referring to FIG. 3 showing the third embodiment of the present invention, the end of the inner ring 111 is provided with an annular flange 180 comprising an engaging portion 178, a cylindrical portion 179, and a rising portion 181 as the first embodiment shown in FIG. 1. An outer race ring 122 provided outside the inner race ring retaining balls 131 therebetween has no flange like a flange 121 shown in FIG. 1 and 2. The outer race ring 122 in this embodiment is extended axially to form an extending portion 123 and is provided with suitable annular seals 21 and 22. The seals 21 and 22 is mounted in the seal mounting grooves formed at the opposite internal peripheries of the outer race ring 122 so that the seals may close the space between the inner and outer race rings 111 and 122, respectively. The seals 21 and 22 are made of annular elastic body of rubber, or any similar resilient material in which a rigid reinforcing ring formed of metal, or other similar material is embedded. The construction of the seals is well known in the art, and accordingly, the description in detail thereof is eliminated here, As mentioned hereinbefore, in the present invention, the hub which has been necessitated in the convention clutch release bearing assembly is not necessary here in this invention, and accordingly, the outer dimension of the clutch release bearing is reduced with the outer ring located comparatively inwardly. In this third embodiment of this invention, the clutch engaging member is engaged with the axially extended portion of the outer race ring and the inwardly and radially extending flange portion as the flange 121 as shown in FIG. 1 is not necessary. By eliminating the flange portion of the clutch release bearing assembly, it becomes possible to mount an oilseal to the both sides of the bearing assembly. Therefore, if a contact seal is used with respect to the inner ring, it will be understood that the invasion of dusts and moisture or dirty water into the interior of the bearing made by the attraction effect caused by the rotation of the clutch assembly is effectively prevented without forming the second cylindrical portion at the outer end of the rising portion as the second embodiment shown in FIG. 2.

As clear from the foregoing description, however, the present invention is not restricted within the above described embodiments.

What is claimed is:

1. A clutch release bearing assembly disposed about a shaft for axial movement along said shaft, said assembly comprising:

an outer race ring having a first side;

an inner race ring having an inner surface disposed directly about said shaft, an outer surface, and an extension of said inner race ring extending axially away from said firt side to an end;

a flange member spaced apart from said shaft fixed to said inner race ring extension end, said flange member having an irregular shape including a cylindrical portion extending along said inner race extension outer surface from said inner race end, a portion extending radially inwardly from said cylindrical portion along said inner race end, and a portion extending radially outwardly to a free edge from said cylindrical portion opposite said race end; and, a plurality of balls interposed between said inner and outer race rings.

2. The bearing assembly in accordance with claim 1, further comprising an annular flange extending radially inwardly from said outer race first side.

3. The bearing assembly in accordance with claim 2 further comprising a cover having a cylindrical portion overlying said outer race ring and a portion extending radially inwardly from the cover opposite the outer race ring first side.

4. The bearing assembly in accordance with claim 3 wherein said flange member further comprises a second cylindrical portion extending toward said outer race firt side from said free edge.

5. The bearing assembly in accordance with claim 1, further comprising an extension of said outer race ring extending axially opposite said first side.

6. The bearing assembly in accordance with claim 5, further comprising seal members extending between and closing the annular space between the inner and outer race rings.

* * * * *